Aug. 30, 1966  J. R. COYLE  3,269,443

BURR FREE SELF-LOCKING SCREW

Filed April 2, 1965

INVENTOR.
JAN R. COYLE

BY Paul A. Weilein
ATTORNEY

United States Patent Office 3,269,443
Patented August 30, 1966

3,269,443
BURR FREE SELF-LOCKING SCREW
Jan R. Coyle, San Dimas, Calif., assignor, by mesne assignments, to Threadline Fastener Corporation, Covina, Calif., a corporation of California
Filed Apr. 2, 1965, Ser. No. 445,097
10 Claims. (Cl. 151—7)

This application is a continuation-in-part of my pending application Serial No. 331,541 filed December 18, 1963, which is a continuation-in-part of my pending application Serial No. 285,810 filed June 5, 1963, both now abandoned.

This invention relates generally to a self-locking screw and more particularly to the construction of the self-locking portion in such a manner as to provide an insert in the threaded stem, the insert being such as to cause lateral pressure to be applied to the stem when engaged in a threaded bore.

Heretofore it has been the practice in the manufacture of self-locking screws to provide a radial opening in the screw body, in which opening is placed a radially extended insert of material such as nylon, for instance. Such recesses have been formed by a radial bore or by elongated radially open channels extending longitudinally of the fastener.

An object of the present invention is to provide a self-locking screw which obtains a superior locking effect at the opposite side of the screw stem from the resilient locking insert by virtue of the fact that the locking force is applied across a wider region than is the case with prior devices, i.e., locking friction is spread over a larger area of the threads.

Yet another object of the invention relates to economy of manufacture of self-locking fasteners and the present invention effects economies from a number of standpoints as compared with the prior art devices as generally referred to above. An important economy is that resulting in the fact that a fastener made in accordance with the invention may be more rapidly produced. That is to say, the unit manufacturing time is less than in the case of conventional self-locking fasteners. This factor will be appreciated in that the present invention involves the removal of significantly less material than the prior art devices employing an elongated axially extended slot and, indeed, the material removed in the production of a fastener in accordance herewith may be less than the material removed in the drilling of a radial recess, while the resultant fastener of the invention has a superior locking effect.

In accordance with the present invention, a recess is formed in the side of the threaded screw stem and such recess is the result of removing an essentially chordal section from the threaded stem, the recess being of any desired thickness in terms of the dimension longitudinally of the screw stem, and preferably the chordal recess is so disposed in relation to the threads that the recess does not bisect a thread crest at such an angle as to cause the formation of burrs. Preferably, the recess is so oriented relative to the threaded screw stem that the side walls of the recess parallel the thread helix or thread crests, under which circumstances the cutter would be adjusted relative to the screw stem during the cutting operation so as form the chordal recess at an angle corresponding to the helix angle of the screw thread. As will be apparent to those skilled in the art, within the teachings of the present disclosure it would also be possible to form a cut at a right angle to the axis of the screw stem and of a thickness between the axially spaced walls of the recess such that the opposing walls are wholly located within adjacent thread crests; but if additional slot thickness is desired, an entire thread segment may be cut away, in which case the cutter will not pass through the crest of the interrupted thread at an acute angle to the lead of the thread such as would normally form burrs, but instead, the thread will be interrupted on a plane corresponding to the bottom of the recess which extends more or less radial to the screw stem depending on the depth of the recess in a radial direction.

In accordance with one embodiment of the invention, the opposing recess walls intersect substantially with the thread crests so as to afford a full "dam" effect for the resilient insert; while, if preferred, the opposing walls of the recess may intersect at the root of adjacent threads, in which case there will be an outwardly extended portion of the insert which is not supported positively by a thread, the space between the insert and the adjacent thread walls affording space to enable elastic deformation of the insert.

The advantages resulting from cutting the recessed portion in a screw without forming burrs are that it avoids the necessity of recutting or using finishing steps in the manufacturing process, and eliminates damage during use of the fastener which would occur if burrs were formed and not removed.

Another object of my invention involves the type of inserts which may be fitted into the recessed portion of the screw, such inserts being of chordal section and having a portion disposed so that a lateral force will be applied to the stem when the latter is engaged in a complemental threaded bore due to the existence of insert material which projects outwardly so as to interfere with the mating thread.

Although the foregoing objects of my invention are regarded as primary, other features may become apparent as the specification proceeds and from the illustration in the drawings, in which.

Like reference characters in the following description and in the drawings designate corresponding parts.

Figure 1:
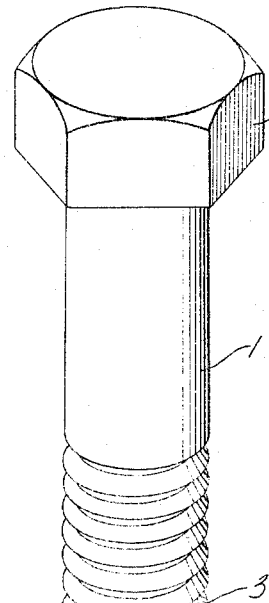
FIG. 1 is an exploded perspective view showing a typical fastener having a recess in accordance with the invention and showing the insert to be employed in the recess.
Figure 2:
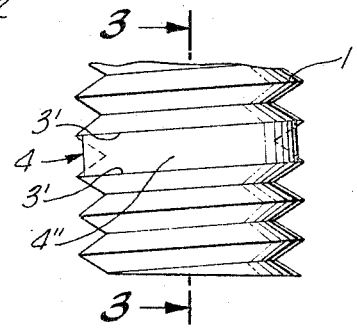
FIG. 2 is a fragmentary elevational view of a threaded fastener stem section illustrating the insert installed.
Figure 3:
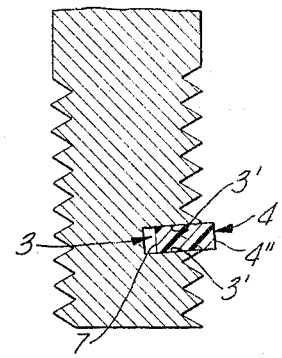
FIG. 3 is a vertical mid-section on the line 3—3 of FIG. 2.

In FIG. 1 there is shown a typical bolt comprising a threaded shank or stem 1 having a head 2 and having a recess 3 formed in the threaded section of the stem. The recess 3 is essentially a chordal recess having opposing walls 3' which, in this embodiment, extend in parallel relation to the helix of the thread, the space between the walls 3' being equal to the distance between adjacent thread crests, as best seen in FIGS. 2 and 3, for example. The base wall of the slot or recess 3 is, of course, located on a chordal line, and for simplicity is preferably flat and straight.

Adapted to be installed in the recess 3 is an insert generally denoted at 4 of chordal shape so as to fit the recess 3 and preferably, though not necessarily, of a thickness such that it must be press-fit between the opposing walls 3' and 3'. The insert 4 may be composed of various materials and, in the event that such material is not inherently susceptible of elastic deformation as in the case of certain metal inserts, the inner wall 4' of the insert is recessed as at 7 to enable the insert to be resiliently deformed. In the event that the insert is composed of elastically deformable material such as nylon, the recess 7 affords space into which the nylon material may be caused to flow under compression, if such space is necessary, as will hereinafter more fully appear.

As best illustrated in FIGS. 2 and 3, the insert 4, and more particularly the outer generally cylindrical wall 4" thereof, projects from the recess beyond the root of the threads so as to interfere with or be engaged by the mating threads of a nut or other member having a complemental threaded bore. In the illustrative embodiment of FIGS. 2 and 3, indeed, the outer wall 4" of the insert projects outwardly beyond the crests of the threads.

Figure 4:
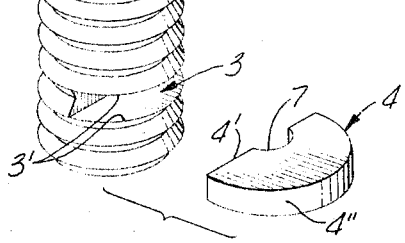
FIG. 4 is a view corresponding to FIG. 3, but showing the fastener stem installed in a nut and illustrating the manner in which the insert is deformed to accomplish the locking function, the illustration of a gap between the threads on the right side of this view being exaggerated, while the locking threads on the left side of the view are shown as being in tight contact.
Figure 4:
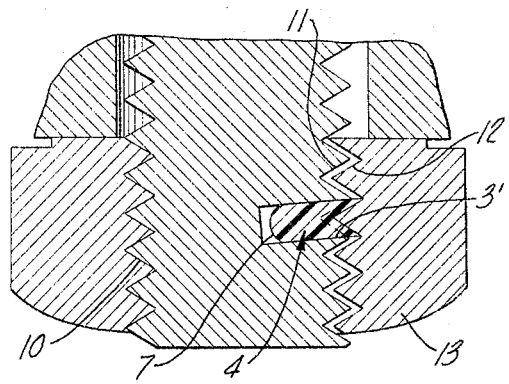

FIG. 4 serves to demonstrate the manner in which the insert 4 is deformed to accomplish the locking function. In this figure the mating threads 10 on the left-hand side of this view are in tight contact, whereas (as shown slightly exaggerated) the mating threads on the right-hand side, in the area of the insert, are slightly apart as a result of the lateral force applied to the screw stem by the insert 4. It will be noted that as the thread crests of the nut 13 engage and cause deformation of the insert 4, the recess 7 has afforded space into which the insert material has been deformed, as would occur in the case of a plastic or nylon insert. However, it has been found that the recess 7 is not necessarily essential and that while material such as nylon is not generally recognized as being compressible, in the use of an insert construction as shown in FIG. 4 absent the recess 7 and with the insert dammed by the side walls 3' of the recess extending to the thread crests, the insert material, when composed of nylon, neither extrudes between the mating threads of the nut and bolt, nor is sheared off as the insert is threaded into the nut and, therefore, it appears that the nylon material is virtually compressed within itself to effect the locking action.

In the structure thus far described, it is apparent that the present invention comprises two features, namely, the "burr elimination" stressed in the originally filed application above mentioned, and also the fact that by cutting the recessed portion of the bolt as disclosed in FIGS. 1 through 4, the crest portions of the threads adjacent the recess function as a "dam" to confine the insert material as the nut 13 is being applied to the bolt, eliminating or minimizing the cutting or peeling of the insert during assembly of the nut and bolt, as well as preventing longitudinal displacement of the insert material. Accordingly, the specific means of applying the cut of the recessed portion accomplishes a double benefit; the elimination of the "burr" and provision of a locking device of improved holding or locking power.

As previously mentioned, a further advantage is derived from the fact that the insert is of chordal form and, therefore, has pressure contact with the nut and the threaded fastener stem across an extended transverse region, namely, the length of the chordal base of the recess engaged by the surface 4' of the insert. This advantage is that the locking or bearing area of contact between the mating threads opposite the insert is subjected to locking pressure over a correspondingly wide transverse region, this area of pressure application, therefore, being greatly increased as compared with conventional locking fasteners having plastic locking inserts.

Figure 5:
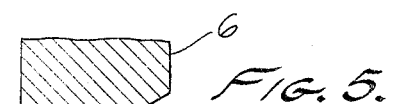
FIG. 5 is a view generally corresponding to FIG. 3, but showing a modified insert which longitudinally spans a thread.

Referring to FIG. 5, the structure is essentially the same as that heretofore described, except that the insert designated 4a in this view has greater axial extent. This is to say, the opposing walls 3', 3' forming the recess 3 in FIG. 5 are spaced apart so that an entire thread crest is spanned by the recess and the insert is therefore of greater volume without requiring that the recess be made deeper. By virtue of this structure, a greater volume of deformable material is employed without further reducing the remaining cross-sectional stem area which, of course, determines the tensile strength of the screw stem.

Figure 6:
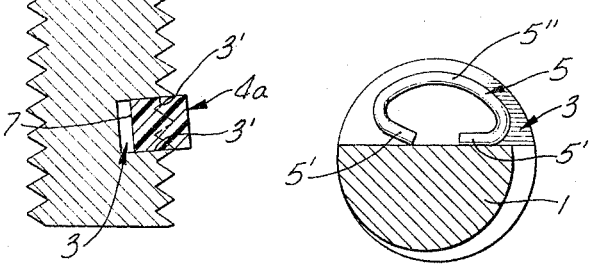
FIG. 6 is a transverse sectional view through a slotted fastener stem containing a modified insert construction.
Figure 6:
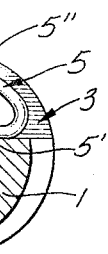

Since there may be need in certain types of use for other than plastic inserts, a modified form is shown in FIG. 6 which includes a resilient metal member or spring 5 which could be employed. The spring 5, as herein illustrated, has terminal portions 5' bent towards one another so as to engage the bottom wall of the chordal recess 3; the spring member 5 will, of course, exert a force radial of the screw stem upon installation of the fastener and the outer arcuate portions 5" of the metallic insert 5 will engage the thread on the threaded nut or other complemental threaded member.

Figure 7:
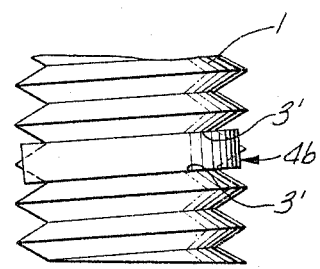
FIG. 7 is a view substantially corresponding to FIG. 2 but showing a modified form of insert wherein opposing walls of the recess in which the insert is installed extend along the thread roots.

Referring now to FIG. 7, a modification is shown, and it will be noted that the insert designated 4b is disposed in a slot, the opposing walls 3' of which intersect the thread root so that the outer marginal portion of the insert 4b is spaced from the adjacent thread walls, thereby affording space into which the deformable material of the insert 4b may be deformed by the threads of the complemental nut 13 or other member into which the threaded stem is driven.

Figure 8:
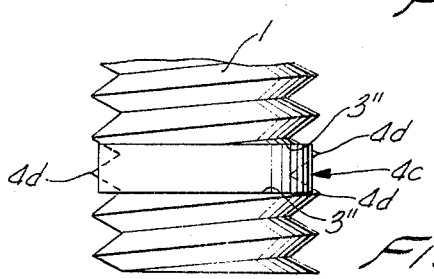
FIG. 8 is a view corresponding generally to FIG. 7 but illustrating an insert wherein the chordal recess is essentially at right angles or normal to the axis of the fastener stem.

In FIG. 8 a further modification is shown in which the opposing walls designated 3" forming the recess which contains the insert 4c and the walls 3" are parallel and on a plane extending at right angles to the axis of the stem 1. These opposing side walls of the slot intersect the threads wholly within the angular thread wall and do not intersect a thread crest. Only the chordal base wall of the recess intersects a thread crest at the ends of the base wall, as shown at 4d. The interruption to the thread crest is, therefore, in this embodiment, such that no burrs are formed as would result in the cutting through a crest at an acute angle to the helix or lead angle of the thread.

While I have shown and described certain specific forms of my invention, it is to be understood that various changes and modifications may be made, as deemed desirable, within the scope of the appended claims.

I claim:

1. In a screw having an externally threaded body portion: a chordal slot extending into said body portion; said slot being formed along the line of the thread helix between the threads of said screw; said slot being aligned with the root of the thread; said slot comprising side walls extending from the periphery of said screw inwardly to a juncture with a base wall extending chordally of said body; said base wall being between said periphery and the screw axis and said slot extending to and opening through opposite sides of said screw; said side walls extending parallel to the crest of said thread; a resilient plastic insert being fitted into said slot; said insert being generally complementary in shape to the configuration of said slot but having a chordal base wall with a central depression and having an outer portion extending outwardly of the root of the thread for locking engagement with a mating female screw thread; the outer portion thereof conforming to the thread contour of the said body.

2. In a screw having an externally threaded body portion adapted to be engaged in a threaded bore of a complemental member: a chordal slot extending into said body portion; said slot being formed along the line of the thread helix between the threads of said screw; said slot being aligned with the root of the thread; said slot comprising side walls extending from the periphery of said screw inwardly to a juncture with a base wall extending chordally of said body; said base wall being between said periphery and the screw axis and said slot extending to and opening through opposite sides of said screw; said side walls extending parallel to the crest of said thread; a resilient insert composed of a flowable material softer than the material of said complemental member; said insert being fitted into said slot; said insert being generally complementary in shape to the configuration of said slot but having a chordal base wall with a central depression and having an outer portion extending outwardly of the root of the thread for locking engagement in said threaded bore, the outer portion thereof conforming to the thread contour of the said body portion.

3. In a screw having an externally threaded body portion adapted to be engaged in a threaded bore of a complemental member: a chordal slot extending into said body portion; said slot being formed along the line of the thread helix between the threads of said screw; said slot being aligned with the root of the thread; said slot comprising side walls extending from the periphery of asid screw inwardly to a juncture with a base wall extending chordally of said body; said base wall being between said periphery and the screw axis and said slot extending to and opening through opposite sides of said screw; said side walls extending parallel to the crest of said thread; a resilient insert composed of a flowable material softer than the material of said complemental member; said insert being fitted into said slot; said insert being generally complementary in shape to the configuration of said slot but having a chordal base wall and having an outer portion extending outwardly of the root of the thread for locking engagement with the threads in the bore of said complemental member; the outer portion thereof conforming to the thread contour of the said body.

4. In a screw having an externally threaded body portion adapted to be engaged in a threaded bore of a complemental member: a chordal slot extending into said body portion; said slot being formed along the line of the thread helix between the threads of said screw; said slot being aligned with the root of the thread; said slot comprising side walls extending from the periphery of said screw inwardly to a juncture with a base wall extending chordally of said body; said base wall being between said periphery and the screw axis and said slot extending to and opening through opposite sides of said screw; said side walls extending parallel to the crest of said thread; a resilient plastic insert being fitted into said slot; said insert being generally complementary in shape to the configuration of said slot but having a chordal base wall and having an outer portion extending outwardly of the root of the thread for locking engagement with the threads in the bore of said complemental member; the outer portion thereof conforming to the thread contour of the said body.

5. In a screw having an externally threaded body portion: a chordal slot extending into said body portion; said slot being formed between the threads of said screw; said slot comprising side walls extending from the periphery of said screw inwardly to a juncture with a base wall extending chordally of said body; said side walls intersecting only the flanks of the threads; said base wall being between the region of the periphery of said screw interrupted by said slot and the screw axis and said slot extending to and opening through opposite sides of said screw; a resilient plastic insert being fitted into said slot; said insert being generally complementary in shape to the configuration of said slot but having a chordal base wall with a central depression and having an outer portion extending outwardly of the root of the thread for locking engagement with a mating female screw thread; the outer portion thereof conforming to the thread contour of the said body.

6. A threaded member as defined in claim 5, wherein said side walls defining said slot extend transversely of said member at right angles to the axis thereof.

7. A self-locking fastener adapted to be engaged in a threaded bore of a complemental member, comprising: an externally threaded body having an essentially chordal slot extending into the body; said slot being formed between the crests of the threads of said body and being defined by side walls extending inwardly from the outer periphery of said body and spaced axially of the body; said side walls intersecting only the flanks of the the threads and a base wall extending chordally across said body between said side walls; said slot extending to and opening through opposite sides of said body, said bottom wall being between the outer periphery of said body interrupted by said slot and the axis of said body; and a deformable insert composed of a flowable material softer than the material of said complemental member; said insert generally conforming to said slot and to the periphery of said body and having side walls engaged with said side walls of said slot and having an outer portion extending outwardly of the root of the thread on said body for engagement with the threads of the complemental member so as to be deformed by the latter and having a base wall engaged with said slot base wall at least adjacent the lateral extremes of said insert base wall.

8. A threaded member as defined in claim 7, wherein said slot is formed along the line of the thread helix between adjacent threads on said body.

9. A threaded member as defined in claim 7, wherein said insert is composed of resilient plastic material.

10. A threaded member as defined in claim 7, wherein said slot is formed along a plane at a right angle to the axis of said body.

References Cited by the Examiner

UNITED STATES PATENTS

| | | | |
|---|---|---|---|
| 2,608,229 | 8/1952 | Brutus | 151—7 |
| 2,654,410 | 10/1953 | Proctor | 151—25 |
| 3,020,570 | 2/1962 | Wallace et al. | 151—7 |
| 3,091,271 | 5/1963 | Samiran | 151—25 |

FOREIGN PATENTS 1,043,119   6/1953   France.

EDWARD C. ALLEN, *Primary Examiner.*